United States Patent
Bultan et al.

(10) Patent No.: US 7,680,071 B2
(45) Date of Patent: Mar. 16, 2010

(54) METHOD AND APPARATUS FOR MANAGING POWER DURING A DISCONTINUOUS RECEPTION MODE

(75) Inventors: Aykut Bultan, Bayside, NY (US); John W. Haim, Baldwin, NY (US); Kenneth P. Kearney, Smithtown, NY (US); Robert A. DiFazio, Greenlawn, NY (US); Donald M. Grieco, Manhassett, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 510 days.

(21) Appl. No.: 11/322,705

(22) Filed: Dec. 30, 2005

(65) Prior Publication Data

US 2007/0064662 A1    Mar. 22, 2007

Related U.S. Application Data

(60) Provisional application No. 60/717,997, filed on Sep. 16, 2005.

(51) Int. Cl.
    G08C 17/00        (2006.01)
(52) U.S. Cl. ................. 370/311; 370/278; 370/466; 455/572; 455/574
(58) Field of Classification Search .............. 370/311; 455/572, 574
    See application file for complete search history.

(56) References Cited

U.S. PATENT DOCUMENTS 5,943,613 A * 8/1999 Wendelrup et al. ....... 455/343.1
2003/0137969 A1 * 7/2003 Abdesselem et al. ........ 370/350
2003/0153368 A1 * 8/2003 Bussan et al. ............. 455/574
2004/0090947 A1 * 5/2004 Wilborn et al. ............ 370/345
2005/0043068 A1 * 2/2005 Shohara et al. ........... 455/574
2005/0255879 A1 * 11/2005 Shi et al. ................ 455/552.1
2006/0045215 A1 * 3/2006 Ballantyne et al. ......... 375/344

OTHER PUBLICATIONS

Third Generation Partnership Project, "Technical Specification Group Radio Access Network; User Equipment (UE) procedures in idle mode and procedures for cell reselection in connected mode (Release 5)," 3GPP TS 25.304 V5.8.0 (Mar. 2005).
Third Generation Partnership Project, "Technical Specification Group Radio Access Network; User Equipment (UE) procedures in idle mode and procedures for cell reselection in connected mode (Release 5)," 3GPP TS 25.304 V5.9.0 (Sep. 2005).
Third Generation Partnership Project, "Technical Specification Group Radio Access Network;User Equipment (UE) procedures in idle mode and procedures for cell reselection in connected mode (Release 6)," 3GPP TS 25.304 V6.6.0 (Jun. 2005).

(Continued)

*Primary Examiner*—Rafael Pérez-Gutiérrez
*Assistant Examiner*—Liton Miah
(74) *Attorney, Agent, or Firm*—Volpe and Koenig, P.C.

(57) ABSTRACT

A method and apparatus for managing power during discontinuous reception (DRX) mode are disclosed. A DRX mode is defined for a wireless transmit/receive unit (WTRU) for reducing power consumption of the WTRU. During the DRX mode, the WTRU enters into a sleep state and periodically wakes up for processing paging blocks for detecting a paging indication for the WTRU and a corresponding paging message. If the WTRU is paged the WTRU terminates the DRX mode. If the WTRU is not paged, the WTRU reenters the sleep state. For power management during the DRX mode, a synchronization update period is defined. The synchronization update period is a period for performing automatic frequency correction and/or frame time correction.

40 Claims, 3 Drawing Sheets

OTHER PUBLICATIONS

Third Generation Partnership Project, "Technical Specification Group Radio Access Network; User Equipment (UE) procedures in idle mode and procedures for cell reselection in connected mode (Release 6)," 3GPP TS 25.304 V6.7.0 (Sep. 2005).

Third Generation Partnership Project, "Technical Specification Group Radio Access Network; Physical layer; Measurements (TDD) (Release 6)," 3GPP TS 25.225 V6.1.0 (Mar. 2004).

Third Generation Partnership Project, "Technical Specification Group Radio Access Network; Requirements for support of radio resource management (TDD) (Release 4)," 3GPP TS 25.123 V4.13.0 (Jun. 2004).

Third Generation Partnership Project, "Technical Specification Group Radio Access Network; Requirements for support of radio resource management (TDD) (Release 5)," 3GPP TS 25.123 V5.10.0 (Jun. 2004).

Third Generation Partnership Project, "Technical Specification Group Radio Access Network; Requirements for support of radio resource management (TDD) (Release 6)," 3GPP TS 25.123 V6.3.0 (Sep. 2004).

Third Generation Partnership Project, "Technical Specification Group Radio Access Network; Requirements for support of radio resource management (TDD) (Release 6)," 3GPP TS 25.123 V6.4.0 (Sep. 2004).

* cited by examiner

METHOD AND APPARATUS FOR MANAGING POWER DURING A DISCONTINUOUS RECEPTION MODE

CROSS REFERENCE TO RELATED APPLICATION

This application claims the benefit of U.S. Provisional Patent Application No. 60/717,997 filed Sep. 16, 2005, which is incorporated by reference as if fully set forth.

FIELD OF INVENTION

The present invention is related to wireless communication systems. More particularly, the present invention is related to a method and apparatus for managing power during a discontinuous reception (DRX) mode.

BACKGROUND

Reducing power consumption is one of the most important challenges when designing the wireless transmit/receive units (WTRUs). Increased bandwidth, higher data rates and multimedia user interfaces result in higher power demands for new WTRUs as compared to previous generations of WTRUs.

The DRX mode is intended to identify periods of relative inactivity of the WTRU, which provides opportunities to conserve battery power by powering down various on-board components in the WTRU. The WTRU is informed of occasions when the WTRU must wake up to receive transport information.

The WTRU radio resource control (RRC) has a connected mode and an idle mode. The connected mode includes an active connected mode and an inactive connected mode. In the connected mode, the WTRU RRC has four states: CELL_DCH, CELL_FACH, CELL_PCH, and URA_PCH. The CELL_DCH and the CELL_FACH states take place only in the active connected mode, and the CELL_PCH and the URA_PCH states take place only in the inactive connected mode. The DRX mode takes place in the inactive connected mode, (CELL_PCH, URA_PCH states), and in the idle mode.

The basic difference between DRX in the idle mode and the connected mode is that, in the idle mode, it is the core network (CN) that controls the DRX cycle; whereas in the inactive connected mode, it is the universal mobile telecommunication system (UMTS) terrestrial radio access network (UTRAN) that controls the DRX cycle.

During DRX mode, the WTRU must wake up on Paging Occasions (POs) as directed by the RRC, based on system information settings. A PO indicates the beginning of a paging block. The RRC is responsible for scheduling the time, the duration and on which channel the physical layer of the WTRU must listen to.

SUMMARY

The present invention is related to a method and apparatus for managing power during DRX mode. During the DRX mode, the WTRU enters into a sleep state and periodically wakes up for processing paging blocks for detecting a paging indication for the WTRU and a corresponding paging message. If the WTRU is paged, the WTRU terminates the DRX mode. If the WTRU is not paged, the WTRU reenters the sleep state. For power management during the DRX mode in the WTRU, a synchronization update period is defined. The synchronization update period is a period for performing automatic frequency correction (AFC) and/or frame time correction (FTC).

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment.

The features of the present invention may be incorporated into an integrated circuit (IC) or be configured in a circuit comprising a multitude of interconnecting components.

Hereinafter, the present invention will be explained with reference to UMTS time division duplex (TDD) systems. However, the present invention is applicable to any wireless communication systems including, but not limited to, UMTS frequency division duplex (FDD), TD-SCDMA, CDMA 2000, or the like.

The present invention provides an efficient power management method for the physical layer of a WTRU. In accordance with the present invention, AFC and FTC are performed during DRX mode, and a sleep timer is preferably provided for synchronization during DRX mode. The WTRU updates its frame synchronization and timing synchronization periodically during DRX mode to be able to successfully read paging indicators (PIs) and perform cell reselection measurements. Periodic DRX activities for the physical layer include cell reselection and the related measurements, monitoring PIs and maintaining frame and timing synchronization.

Five different physical layer states are defined as follows: an active connected state, an inactive connected state, a sleep state, a PI reading state, and a synchronization update state. During the active connected state, almost all components are powered on and normal operation for communication is performed. During the inactive connected state, some components are powered down. During the sleep state, most of the components are powered down and the WTRU neither reads the paging block nor updates the frame or timing synchronization. Functionality required during the sleep state is limited to monitoring clock, detection of user activity and interface with debug equipment, and activation of triggers to wake-up various on-board components in sequence. During the PI reading state, the WTRU wakes up from the sleep state to read the related PI via a paging indicator channel (PICH) in each paging block. If the WTRU detects that it is paged through the related PI in the PICH, the WTRU reads a paging channel (PCH) to access the paging message. Otherwise, the WTRU returns to the sleep state. During the synchronization update state, synchronization updating is performed, AFC and FTC are run and TCXO control voltage and frame synchronization are updated.

Figure 1:
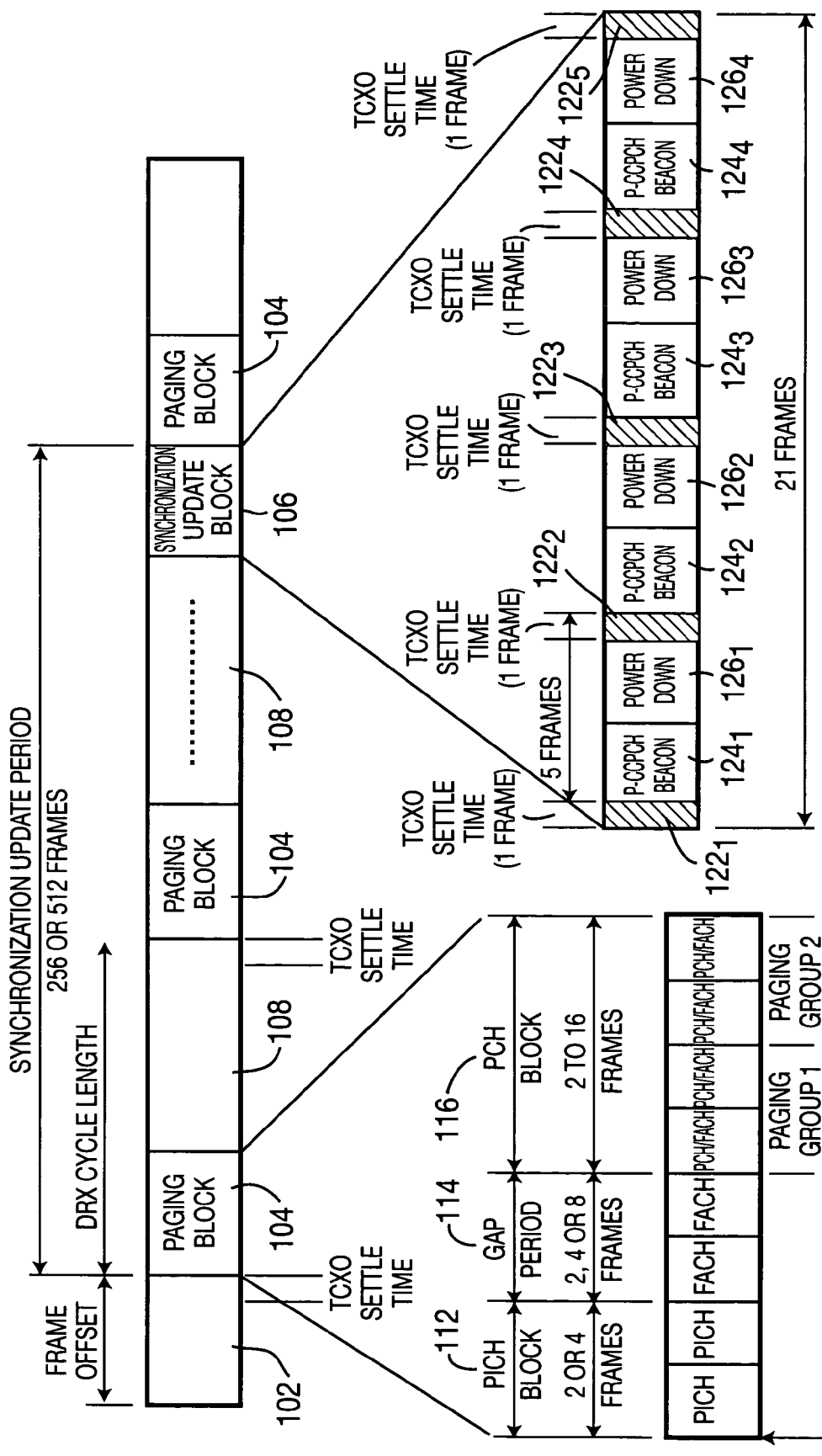
FIG. 1 is a diagram of time slot level timing requirements for DRX mode in accordance with the present invention.

FIG. 1 is a diagram of time slot level timing requirements for DRX mode in accordance with the present invention. A frame offset 102 is generated by the FTC for frame synchronization, which will be explained hereinafter. During DRX mode, the WTRU may be in the sleep state, in the PI reading state or in the synchronization update state. The WTRU enters the PI reading state sometime in the paging block 104 and enters the synchronization update state in the sync update block 106. The WTRU is in the sleep state in the remaining blocks 108.

A DRX cycle length is the time difference between two POs for a specific WTRU. In UMTS TDD, one PO corresponds to one paging block. Therefore, the DRX cycle length is the time difference between two paging blocks 104. A paging block 104 comprises a PICH block 112, a gap period 114 and a PCH block 116. The PICH block 112 comprises 2 or 4 frames of PIs. The gap period 114 comprises 2, 4, or 8 frames where physical resources can be used by other channels. The PCH block 116 comprises 2 to 16 frames of paging messages for one to eight paging groups. For the idle mode, the allowed DRX cycle lengths are 0.64, 1.28, 2.56 and 5.12 seconds. For the inactive connected mode, the allowed DRX cycle lengths are 0.08, 0.16, 0.32, 0.64, 1.28, 2.56 and 5.12 seconds.

The synchronization update period is a period between two consecutive sync update blocks 106. The synchronization update period is preferably set to 256 or 512 frames depending on the DRX cycle length. The sync update block 106 preferably, but not necessarily, comprises 21 frames. The first frame $122_1$ is for TCXO settle time and every fifth frame $124_1$-$124_4$ starting from the second frame is processed for AFC and FTC, which will be explained in detail hereinafter. The TCXO settle frames $122_2$-$122_5$ are also provided before each frame $124_1$-$124_4$ to be processed. During the intervening frames $126_1$-$126_4$, each of which is three frames, the WTRU is powered is down. Therefore, during the synchronization update block, the WTRU is periodically powered up and powered down for AFC and FTC. If the DRX cycle length is 16 frames, the sync update block 106 may overlap one paging block 104, and if the DRX cycle length is 8 frames, the sync update block 106 may overlap two paging blocks 104. In these cases, regular paging procedures and synchronization update activities are implemented in parallel.

Figure 2:
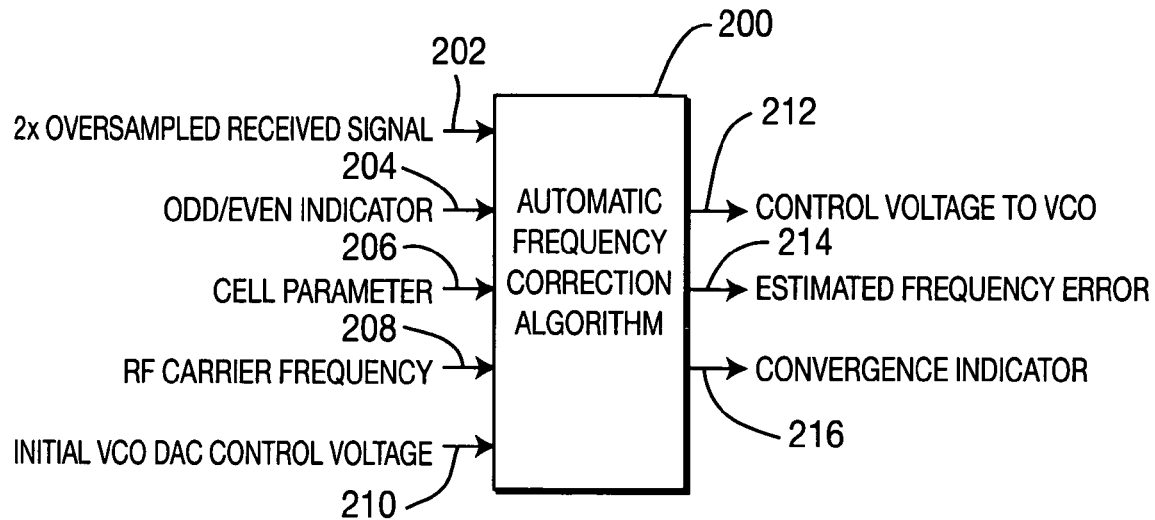
FIG. 2 shows inputs and outputs for an AFC algorithm.

AFC operation will now be described. Since a specific implementation of AFC is not within the scope of the present invention, AFC operation will only be briefly described. FIG. 2 shows inputs and outputs for an AFC unit 200 which implements an AFC algorithm. A received signal 202 (preferably 2× over-sampled), an odd/even frame indicator 204, a cell parameter 206, RF carrier frequency 208 and initial voltage controlled oscillator (VCO) digital-to-analog converter (DAC) control voltage 210 are input for the AFC unit 200 based upon a user defined value or a previously stored value. The AFC unit 200 outputs are a control voltage to the VCO 212, an estimated frequency error 214 and a convergence indicator 216. The operating frequency of the VCO is determined by the control voltage 212. The convergence indicator 226 indicates that the AFC algorithm reaches a steady state.

Figure 3:
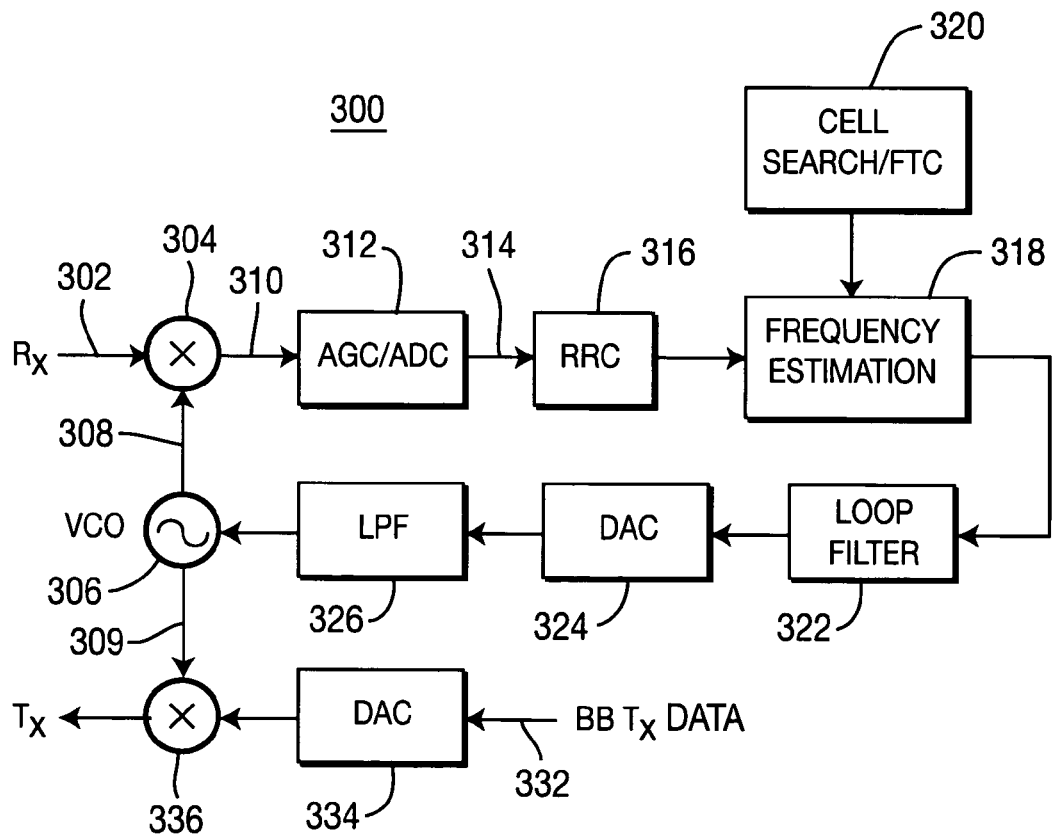
FIG. 3 is a block diagram of a closed loop AFC.

FIG. 3 is a block diagram of a closed loop AFC unit 300. Received signals 302 are mixed with signals 308 generated by the VCO 306 by a multiplier 304 to be converted to baseband signals 310. The baseband signals 310 are converted to a digital data 314 by an analog-to-digital converter (ADC) 312. The digital data is processed by a raised root cosine (RRC) filter 316 and fed into a frequency estimation block 318. A frequency error is computed by the frequency estimation block 318 and a cell search/FTC block 320 and the estimated frequency error 214 is sent to a loop filter that generates the correction voltage for the VCO 306. This correction voltage is converted to a digital signal by a digital-to-analog converter (DAC) 324 and filtered by a low pass filter (LPF) 326 and drives the measured frequency error to zero in a steady state. Baseband transmit data 332 is converted to an analog data 335 by a DAC 334 and multiplied with a VCO output 309 by a multiplier 336 for transmission.

During the active connected state, AFC is running as normal. Before entering into the DRX mode, the last value of the VCO DAC register is saved in memory. This value is used during the DRX mode until the next VCO value is available from synchronization update. During the sleep state and the inactive connected state, since there is no data reception, AFC is shut down when the processing from the previous active timeslots is completed. During the PI reading state, AFC is running and the P-CCPCH beacon is read during each frame in the paging block. During the synchronization update state, AFC runs using only one midamble per frequency update and with special timing as shown in FIG. 1. However, during the PI reading period, the number of midambles processed per frame depends on the frequency error, which is similar to the AFC operation during the active connected mode.

There are two reasons for running AFC during the DRX mode. The first reason is the effect of WTRU motion on the acquired sampling period of the WTRU, which is controlled by the VCO 306. If the speed of the WTRU changes during the sleep interval, the difference in speed of the WTRU before and during the sleep cycle will look like an extra drift rate change in the VCO 306. As an example, assume that the WTRU is not moving before the DRX cycle. Afterwards, the WTRU goes into the DRX mode. Also assume that, when the WTRU goes into a synchronization update state during DRX mode, the speed of the WTRU becomes 120 km/h, which is the maximum speed from WG4 test cases. As a result, the difference in speed is Vd=120 km/h. This speed corresponds to $Drift_{ppm}$=(vd/c)×1.0e6=0.11 ppm drift, where c is the speed of light. However, this drift is extremely unlikely since the maximum time difference between the beginning of a DRX cycle and the next synchronization update may be approximately five seconds. Since this number is not the driving requirement for the design, it can be kept as described hereinbefore. Additionally, a possibility of an extra drift rate change due to turning off the VCO during the DRX period requires a VCO control voltage update during DRX.

To correct for this possible change in drift rate, the WTRU wakes up at the beginning of the sync update block and performs AFC and FTC. Since AFC needs to update the VCO control voltage, all the physical layer components preceding AFC should be working as well. This includes a root raised cosine (RRC) filter, an automatic gain control (AGC), and a gain scaler.

At the beginning of the sleep period of a DRX cycle, the receiver and the TCXO are shut down. The radio must be powered up before every synchronization update. The TCXO and phase locked loop (PLL) joint power up time is around 5 msec. The synthesizer and other hardware components require much less time to power up. Therefore, the radio should preferably power-up at least 5 msec before the first frame necessary to process, (i.e., paging blocks and frames for AFC and FTC). This is a radio power-up time, (which is shown as "TCXO settle time" before each paging block and during the sync update block in FIG. 1). The radio power-up time may be designated to a start of a given frame, (i.e., one frame earlier than the start of each paging block or first P-CCPCH beacon frame to be read).

The synchronization update block preferably comprises 21 frames. The first frame (and every fifth frame thereafter) is for TCXO settling time as explained hereinbefore. A beacon, (i.e., P-CCPCH signal), is then acquired every fifth frame starting from the second frame of the synchronization update block. The midamble part of the first P-CCPCH timeslot is extracted and passed to the frequency estimation unit for new frequency error estimation. After reading the beacon, the power is shut down and then up again at the next TCXO settle time for reading the next beacon. This is repeated four times during the synchronization update state.

Using beacons separated in time, instead of using four beacons from consecutive frames, increases robustness of frame synchronization under slow fading conditions. The midambles processed during the synchronization update state are summarized in Table 1. It should be noted that the specific numerical selections in the foregoing paragraphs and Table 1, (and throughout this document), are provided as an example, not as a limitation, and any other numbers may be used alternatively.

TABLE 1

| DRX cycle length | synchronization update period | P-CCPCH frame numbers used | Radio wake up frame number | Next PO |
|---|---|---|---|---|
| 8, 16, 32, 64, 128, 256 | 256 | 256N- 20<br>256N- 15<br>256N- 10<br>256N- 5 | 256N - 21 | 256N |
| 512 | 512 | 512N- 20<br>512N- 15<br>512N- 10<br>512N- 5 | 512N - 21 | 512N |

The timing of these frames for AFC is also used for FTC. Since AFC has its own multipath search window, AFC can work without waiting for a frame synchronization update. Therefore, AFC and FTC may run at the same time. Since both AFC and FTC only use P-CCPCH midambles, it is computationally easier to run them at the same time. Therefore, AFC simply borrows this timing schedule from FTC.

The synchronization update rate preferably depends on the DRX cycle length as summarized in Table 1. For DRX cycle lengths up to 256 frames, the synchronization update period is 256 frames and for the DRX cycle length of 512 frames, the synchronization update period is 512 frames.

The midamble processing and frequency update for AFC during DRX mode is the same as in the connected mode, with the exception of the number of midambles used per frequency update. In the connected mode, the number of midambles per frequency update depends on the previous frequency error as described hereinbefore. In the synchronization update state, only one midamble per update is used, independent of the frequency error.

During paging blocks, AFC runs only if it has not converged during the preceding sync update period, which will be described in detail hereinafter. In each PO, the WTRU wakes up from the sleeping state and checks for a PI. As soon as the WTRU decides that it is not being paged, it goes back to the sleep state by powering down the receiver and the TCXO. If the WTRU is being paged, the DRX operation is discontinued. If AFC convergence is declared by the convergence indicator at the start of a paging block following the sync update block, AFC does not run until the next sync update block. For paging blocks not succeeding a sync update block, AFC does not run at all.

If AFC convergence is not declared at the end of the sync update block, AFC performs one frequency update from every P-CCPCH (every frame) during the upcoming paging block. This continues until either AFC has converged or the paging block is over, which ever happens earlier. The convergence is checked after each frequency update. After AFC convergence is declared, there is no need to run AFC further until the next sync update block. If the convergence is not declared by the end of the paging block following the sync update block, AFC continues to run in the upcoming sleep periods.

AFC does not operate during DRX sleep periods, except for the case of non-convergence at the end of a paging block following a sync update block as described hereinbefore. If AFC has converged by the start of a sleep period, the receiver and the TCXO is shutdown. If AFC has not converged at the start of a sleep period, the TCXO remains ON and AFC operates as it does in the connected mode. If convergence is declared during the sleep period, the TCXO and the receiver are shut down for the remainder of the sleep period if the next wake-up time is at least a frame apart from convergence declaration time.

FTC operation will be described hereinafter. Timing within the WTRU should be synchronous to the received signal frame boundaries. Frame synchronization of the WTRU is based on the location of the first significant path (FSP) in the delay spread of the multipath channel. Although the initial cell search performs the initial frame synchronization, there is still a need to maintain frame synchronization to compensate for WTRU motion, shadowing and possible error in the initial cell search. The FTC starts running after initial cell search is completed and AFC comes into a steady state.

Figure 4:
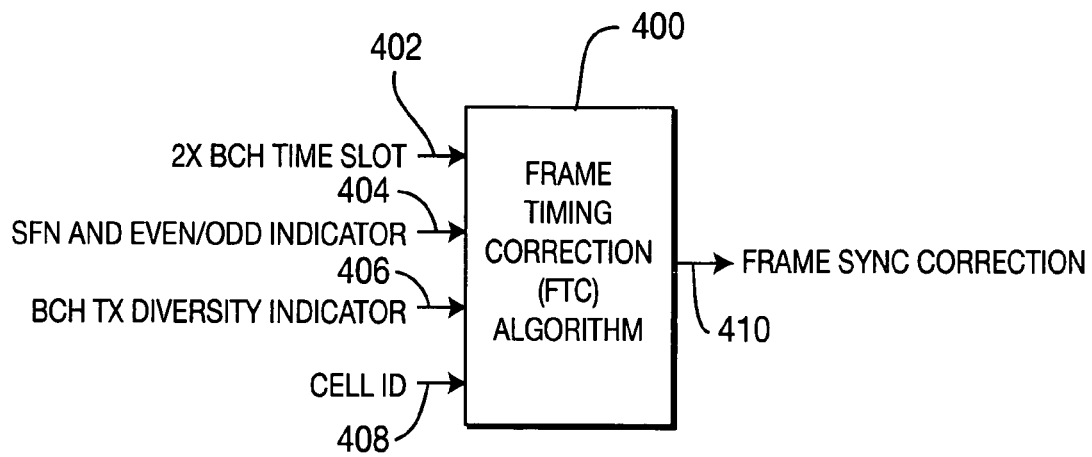
FIG. 4 shows inputs and outputs for FTC operation.
Figure 5:
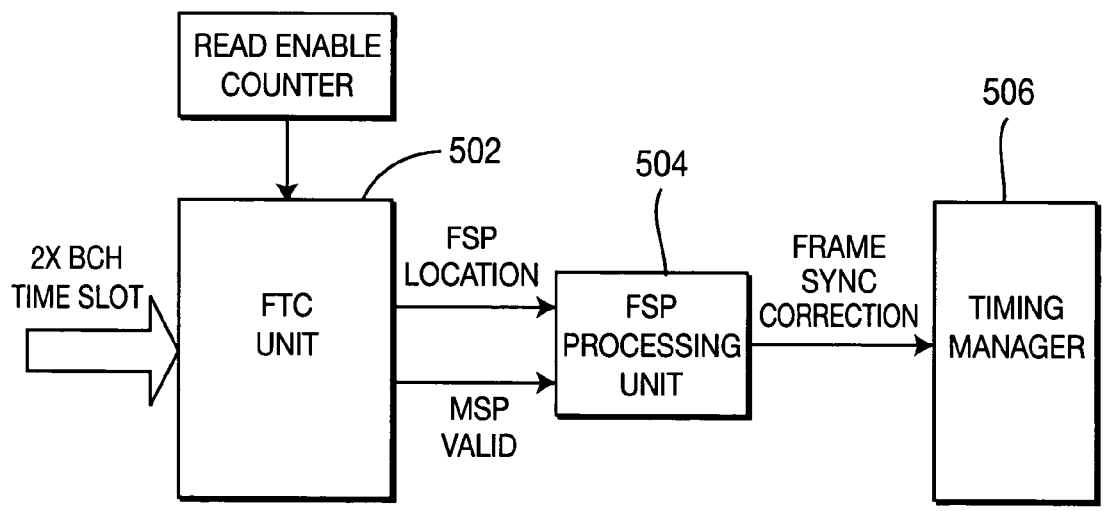
FIG. 5 is a block diagram showing relationship between an FTC unit and a timing manager in a WTRU.

FIG. 4 shows inputs and outputs for an FTC operation and FIG. 5 is a block diagram showing the relationship between an FTC unit 502 and a timing manager 506 in a WTRU. Since a specific implementation of FTC is not within the scope of the present invention, FTC operation will only be briefly described hereinafter. As shown in FIG. 4, broadcast channel (BCH) received signals 402, (preferably 2× over-sampled), a system frame number (SFN) and an even/odd indicator 404, a BCH transmit diversity indicator 406 and a cell ID 408 are inputs for an FTC unit 400 which implements an FTC algorithm. The FTC unit 400 generates a frame sync correction signal 410 as an output. Referring to FIG. 5, an FTC unit 502 finds the position of the FSP by performing correlations of the received BCH midamble(s) over different time lags. After accumulating processing results multiple times, the FTC unit 502 finds the most significant path (MSP) and verifies the validity of the MSP, (i.e., determines if a signal-to-noise ratio (SNR) of the outputs are strong enough to assume that a valid path has been identified). If the MSP value is above a threshold, MSP Valid is ON, otherwise MSP Valid is OFF. If MSP Valid is ON, the FTC unit 502 finds the FSP position by checking each accumulated results above the threshold.

The FSP processing unit 504 receives the FSP location and MSP Valid signal form the FTC unit 502 and sends the Frame Sync Correction signal to the timing manager 506. If MSP Valid is ON, Frame Sync Correction is computed as follows:

Frame Sync Correction=FSP position−Frame Offset.

The constant Frame Offset is set to five chips currently. This is due to the assumption that the maximum delay spread considered is up to 47 chips from the WG4 test cases. For a channel estimate vector of length 57 chips, this leaves a room of 10 chips. Five chips in each direction are reserved for the purpose of possible drifts of frame sync in either direction.

Therefore, the WTRU always sees the FSP in the channel estimator output without any frame synchronization correction up to five chips drift. Therefore, there is no update necessary for short DRX cycles. This prevents unnecessary wake ups of WTRUs and helps conserve battery power. If the magnitude of Frame Sync Correction is greater than $S_{max}$, it is hard limited to $\pm S_{max}$. If MSP Valid is OFF, Frame Sync Correction is set to zero.

During the active connected state, FTC is running. The FTC algorithm continuously adjusts the frame synchronization, (i.e., the frame beginning by controlling the timing manager). The last frame synchronization update in the active connected mode should be used during the DRX cycles until the next update in a synchronization update state. During the sleep state and the inactive connected state, since there is no data reception, FTC is shut down if all the processing from the preceding frames is completed. If all the processing from the preceding frame is not completed, FTC may run in the sleep state, which will be explained hereinafter. During the PI reading state, FTC may be running and P-CCPCH beacon may be read during each frame in the paging block. During the synchronization update state, FTC runs in a different way than in the active connected state.

The FTC tracks frame synchronization under WTRU motion, TCXO drift due to a possible AFC bias and RTC drift. FTC corrects the shifts of the frame beginning in either direction. Since a frame beginning is referenced to an FSP, FTC searches and locates the FSP. Whenever FTC updates the FSP location, the FTC re-calculates the frame synchronization. The FTC is also scheduled during the synchronization update state, and the timing of the frame synchronization update and VCO control voltage update is exactly the same as shown in Table 1.

At the beginning of the sleep period of a DRX cycle, the receiver and the TCXO are shut down. Every synchronization update block, the radio is powered up before the first frame to be read. During sync update blocks, FTC makes one frequency update. The WTRU preferably reads the midambles of four P-CCPCHs, each separated by five frames, as shown in FIG. 1. FTC makes a frame sync update after processing four midambles.

At each PO, (i.e., during the PI reading state), the WTRU wakes up from the sleep state and checks the PI. As soon as the WTRU decides that it is not being paged, it goes back to the sleep state by powering down the receiver and the TCXO. If the WTRU is paged, the DRX operation is discontinued. If MSP Valid is declared by the FTC at the start of a paging block following the sync update block, there is no FTC operation during the paging block. If the MSP Valid is not declared by the FTC at the start of the paging block followed by the synchronization update block, the FTC continues to work during the paging block until it finds an FSP update with MSP Valid declared. During this extended time, FTC uses four consecutive frames instead of separated ones. FTC makes FSP detection from four consecutive frames until it finds one update with MSP Valid. This continues until the paging block is over.

FTC does not operate during the sleep state, except for the case that MSP Valid is not declared at the end of a paging block. If MSP Valid is declared by the start of the sleep period, the receiver and the TCXO are shutdown. If MSP Valid is not declared at the start of the sleep period, the TCXO remains ON and FTC operates on four consecutive frames. If MSP Valid is declared during the sleep period, the TCXO and the receiver are shut down for the remainder of the sleep period if the next wake-up time has not yet occurred.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for power management of a wireless transmit/receive unit (WTRU) during a discontinuous reception (DRX) mode comprising a plurality of DRX cycles, the method comprising:
   entering a sleep state in accordance with a DRX cycle of the plurality of DRX cycles;
   waking up responsive to a start of a synchronization update block for the WTRU to perform at least one of an automatic frequency correction (AFC) and frame time correction (FTC) during the DRX cycle, the synchronization update block comprising a plurality of frames designated for the WTRU performing the at least one of the AFC and the FTC,
   receiving a beacon signal in the synchronization update block;
   extracting midamble signal from the beacon signal; and
   performing the at least one of the AFC and the FTC using the extracted midamble signal during the plurality of frames designated for the WTRU performing the at least one of the AFC and the FTC during the DRX cycle.

2. The method of claim 1 wherein the synchronization update block comprises 21 frames, whereby the AFC and the FTC are performed once in each synchronization update block by processing every fifth frame.

3. The method of claim 1 wherein if an AFC convergence is not declared at a beginning of a paging block following the synchronization update block, the AFC is performed during the paging block following the synchronization update block.

4. The method of claim 3 wherein the AFC is performed in every frame during the paging block following the synchronization update block until the AFC convergence is declared.

5. The method of claim 3 wherein if the AFC convergence is not declared at an end of the paging block following the synchronization update block, the AFC is performed during a following sleep state.

6. The method of claim 5 wherein the AFC is performed in every frame during the sleep state until the AFC convergence is declared.

7. The method of claim 1 wherein if a most significant path (MSP) valid is not declared at a beginning of a paging block following the synchronization update block, the FTC is performed during the paging block following the synchronization update block.

8. The method of claim 7 wherein the FTC is performed in every frame during the paging block following the synchronization update block until the MSP valid is declared.

9. The method of claim 7 wherein if the MSP valid is not declared at the end of the paging block following the synchronization update block, the FTC is performed during a following sleep state.

10. The method of claim 9 wherein the FTC is performed in every frame during the sleep state until the MSP valid is declared.

11. The method of claim 1 wherein a DRX cycle length which is a period between two consecutive paging blocks is one of 8, 16, 32, 64, 128, 256 and 526 frames.

12. The method of claim 1 wherein a period between two consecutive synchronization update blocks is 256 frames for DRX cycle lengths up to 256 frames and 512 frames for the DRX cycle length of 512 frames.

13. The method of claim 1 wherein before entering into the DRX mode, a last value of a voltage controlled oscillator (VCO) digital-to-analog converter (DAC) register is saved in a memory and used during the DRX mode.

14. The method of claim 1 wherein a radio power-up time is defined such that a temperature controlled crystal oscillator (TCXO) wakes up the radio power-up time before start of a frame that the WTRU needs to process.

15. The method of claim 14 wherein the radio power-up time is 5 ms.

16. The method of claim 14 wherein the radio power-up time is defined as one frame length.

17. The method of claim 1 wherein the beacon signals are signals transmitted via a primary common control physical channel (P-CCPCH).

18. The method of claim 1 wherein the AFC and the FTC are performed in the same time frame.

19. A wireless transmit/receive unit (WTRU) for power management during a discontinuous reception (DRX) mode comprising a plurality of DRX cycles, the WTRU comprising:
a plurality of power-consuming components;
a controller configured to:
turn off power to at least one of the power-consuming components in accordance with a DRX cycle of the plurality of DRX cycles and restore the power to the at least one of the power-consuming components responsive to a start of a synchronization update block for the WTRU during the DRX cycle to perform at least one of an automatic frequency correction (AFC) and frame time correction (FTC);
at least one of an AFC unit configured to perform the AFC during a synchronization update block after the controller has restored the power to the at least one of the power-consuming components, and
a FTC unit configured to perform the FTC during a synchronization update block after the controller has restored the power to the at least one of the power-consuming components,
the synchronization update block being a time period comprising a plurality of frames designated for the WTRU performing the at least one of the AFC and the FTC, and
at least one of the AFC and the FTC being performed using a midamble signal extracted from a beacon signal received in the synchronization update block during the plurality of frames designated for the WTRU performing the at least one of the AFC and the FTC during the DRX cycle.

20. The WTRU of claim 19 wherein the synchronization update block comprises 21 frames, whereby the AFC and the FTC are performed once in each synchronization update block by processing every fifth frame.

21. The WTRU of claim 19 wherein if an AFC convergence is not declared at a beginning of a paging block following the synchronization update block, the AFC unit runs the AFC during the paging block following the synchronization update block.

22. The WTRU of claim 21 wherein the AFC is performed in every frame during the paging block following the synchronization update block until the AFC convergence is declared.

23. The WTRU of claim 21 wherein if the AFC convergence is not declared at an end of the paging block following the synchronization update block, the AFC unit runs AFC during a following sleep state.

24. The WTRU of claim 23 wherein the AFC is performed in every frame during the sleep state until the AFC convergence is declared.

25. The WTRU of claim 19 wherein if a most significant path (MSP) valid is not declared by the FTC unit at a beginning of a paging block following the synchronization update block, the FTC unit runs FTC during the paging block following the synchronization update block.

26. The WTRU of claim 25 wherein the FTC is performed in every frame during the paging block following the synchronization update block until the MSP valid is declared by the FTC unit.

27. The WTRU of claim 25 wherein if the MSP valid is not declared by the FTC unit at the end of the paging block, the FTC unit runs FTC during a following sleep state.

28. The WTRU of claim 27 wherein the FTC is performed in every frame during the sleep state until the MSP valid is declared by the FTC unit.

29. The WTRU of claim 19 wherein a DRX cycle length which is a period between two consecutive paging Mocks is one of 8, 16, 32, 64, 128, 256 and 526 frames.

30. The WTRU of claim 19 wherein a period between two consecutive synchronization update blocks is 256 frames for DRX cycle lengths up to 256 frames and 512 frames for the DRX cycle length of 512 frames.

31. The WTRU of claim 19 wherein the AFC unit comprises a memory for storing a last value of a voltage controlled oscillator (VCO) digital-to-analog converter (DAC) register before entering into the DRX mode, whereby the stored value is used during the DRX mode.

32. The WTRU of claim 19 wherein a radio power-up time is defined such that a temperature controlled crystal oscillator (TCXO) wakes up a radio power-up time before a start of a frame that the AFC unit and the FTC unit need to process.

33. The WTRU of claim 32 wherein the radio power-up time is 5 ms.

34. The WTRU of claim 32 wherein the radio power-up time is defined as one frame length.

35. The WTRU of claim 19 wherein the beacon signals are signals transmitted via a primary common control physical channel (P-CCPCH).

36. The WTRU of claim 19 wherein the AFC unit and the FTC unit process a same frame.

37. The method of claim 1, further comprising re-entering the sleep state responsive to finishing reading the beacon signal.

38. The method of claim 37, further comprising waking up from the sleep state periodically during the DRX cycle.

39. The WTRU of claim 19, wherein the controller is further configured to turn off the power to the at least one of the power-consuming components responsive to finishing reading the beacon signal.

40. The WTRU of claim 39, wherein the controller is further configured to restore the power to the at least one power-consuming component periodically during the DRX cycle.

* * * * *